(12) United States Patent
Chen

(10) Patent No.: US 11,040,745 B2
(45) Date of Patent: Jun. 22, 2021

(54) VEHICLE REAR WING STRUCTURE

(71) Applicant: Caruse Design, Inc., Chino Hills, CA (US)

(72) Inventor: Allan Chen, Yilan (TW)

(73) Assignee: CARUSE DESIGN, INC., Chino Hills, CA (US)

( * ) Notice: Subject to any disclaimer, the term of this patent is extended or adjusted under 35 U.S.C. 154(b) by 93 days.

(21) Appl. No.: 16/658,145

(22) Filed: Oct. 20, 2019

(65) Prior Publication Data

US 2021/0114672 A1    Apr. 22, 2021

(51) Int. Cl.
 *B62D 35/00*    (2006.01)
 *B62D 29/04*    (2006.01)
 *B62D 37/02*    (2006.01)

(52) U.S. Cl.
 CPC ......... *B62D 35/007* (2013.01); *B62D 29/043* (2013.01); *B62D 37/02* (2013.01)

(58) Field of Classification Search
 CPC ..... B62D 35/007; B62D 29/043; B62D 37/02
 See application file for complete search history.

(56) References Cited

U.S. PATENT DOCUMENTS

| | | | |
|---|---|---|---|
| 10,618,574 B1 * | 4/2020 | Grajek | B62D 29/043 |
| 10,766,544 B2 * | 9/2020 | Suk | F04D 29/681 |
| 2007/0145776 A1 * | 6/2007 | Grave | B62D 35/007 |
| | | | 296/180.5 |
| 2010/0090497 A1 * | 4/2010 | Beckon | B60Q 1/44 |
| | | | 296/180.5 |
| 2017/0297636 A1 * | 10/2017 | Shinedling | B62D 35/007 |

* cited by examiner

*Primary Examiner* — Lori L Lyjak
(74) *Attorney, Agent, or Firm* — Chun-Ming Shih; best Int'l Patent & trademark

(57) ABSTRACT

Disclosed is a vehicle rear wing structure, that includes a rear wing plate and a rear wing. The rear wing plate includes: a buckle portion, formed into an angular structure, and is used to clip and hold along a front end of the rear wing, so that the rear wing plate is fixed securely onto a surface of the rear wing; a main body portion, formed into a planar structure, and is disposed on a surface of the rear wing, and is connected and fixed to the buckle portion, on an inner surface of a rear part of the main body portion is disposed an adhesive portion; and a protrusion portion formed into a tilt-up structure, this tilt-up structure tilts up along a rear end of the rear wing to form a wind resistant plane.

6 Claims, 7 Drawing Sheets

VEHICLE REAR WING STRUCTURE

BACKGROUND OF THE INVENTION

Field of the Invention

The preferred embodiment of the present invention relates to a rear wing, and in particular to a vehicle rear wing structure, that is provided with a buckle portion, to clip and hold onto the front end of the rear wing, so that the rear wing plate can be fixed securely onto the rear wing, and will not be affected by the wind resistance while the vehicle is moving at high speed. As such, the vehicle rear wing structure can be used for a long period of time, whilst maintaining safe and stable operation of the vehicle.

The Prior Arts

The vehicle rear wing plate, also referred to as rear wing spoiler, is an auxiliary accessory used for a vehicle. The purpose of the rear wing plate is to use its tilt-up structure to generate wind resistance, this wind resistance produces a downward force on the vehicle, and to repress any upward lifting force when the vehicle is moving at a high speed, thereby increasing the grip of the vehicle on the road. Therefore, the basic requirement is that the rear wing plate must be able to withstand the high wind resistance caused by a fast moving vehicle, and to avoid shaking, loosening, or deformation of the rear wing plate.

Presently, the ways of installing the rear wing plate is to firstly use a double-sided adhesive tape to fix it onto the surface of the rear wing. Then, utilize adhesive or a fixing piece to fix the rear wing onto the top surface of the vehicle rear trunk. The shortcoming in using this way of installing is that because the rear wing plate is fixed onto the vehicle rear trunk using double-sided adhesive tape that after a prolonged period of usage, the rear wing plate is liable to be blown away and be lost due to the wind resistance caused by the fast moving vehicle, and a new rear wing plate must be acquired and installed, thereby causing a loss and inconvenience to the user.

Therefore, presently, the design and performance of the rear wing structure is not quite satisfactory, and it leaves much room for improvement.

SUMMARY OF THE INVENTION

In view of the problems and drawbacks of the prior art, the preferred embodiment of the present invention provides a vehicle rear wing structure, to overcome the shortcomings of the Prior Art.

The embodiment of the present invention provides a vehicle rear wing structure, that includes a rear wing plate and a rear wing. Wherein the rear wing plate includes: a buckle portion, formed into an angular structure, and is used to clip and hold along a front end of the rear wing, so that the rear wing plate is fixed securely onto a surface of the rear wing, and the rear wing plate will not be blown away due to wind resistance when a vehicle moves at high speed; a main body portion, formed into a planar plate structure, and is disposed on a surface of the rear wing, and is connected and fixed to the buckle portion, and on an inner surface of a rear part of the main body portion is disposed an adhesive portion, this adhesive portion adheres onto the surface of the rear wing by means of a double-sided adhesive tape; and a protrusion portion, formed into a tilt-up structure, this tilt-up structure tilts up along a rear end of the rear wing to form a wind resistant plane, and it is connected and fixed along a rear end of the main body portion, and it generates a downward force when the vehicle moves at high speed, Wherein, the buckle portion, the main body portion, and the protrusion portion are formed integrally into a body.

In an aspect of the present invention, the angle formed by the buckle portion is less than 90 degrees.

In another aspect of the present invention, the rear wing plate is formed into an acrylic body using a hot pressing method.

In yet another aspect of the present invention, the rear wing plate is formed by carbon fiber using a composite mold method.

In a further aspect of the present invention, the rear wing is connected and fixed onto a top surface of the vehicle rear trunk.

In an aspect of the present invention, the vehicle rear wing structure further includes a plurality of fixing pieces, used to fix the rear wing onto the top surface of the vehicle rear trunk.

Further scope of the applicability of the present invention and embodiments thereof will become apparent from the detailed descriptions given hereafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

Embodiments of the present invention are described below, by way of example only, with reference to the accompanying drawings in which.

DETAILED DESCRIPTION OF THE PREFERRED EMBODIMENT

The purpose, construction, features, functions and advantages of the present invention and its embodiments can be appreciated and understood more thoroughly through the following detailed descriptions with reference to the attached drawings.

Figure 1:
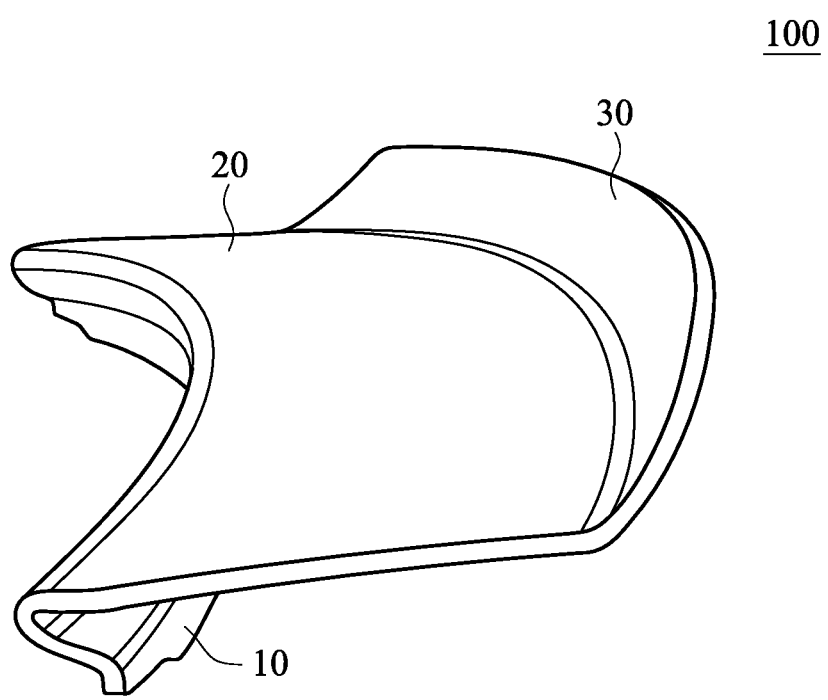
FIG. 1 is a top view of a rear wing plate of a vehicle rear wing structure according to the present invention.
Figure 2:
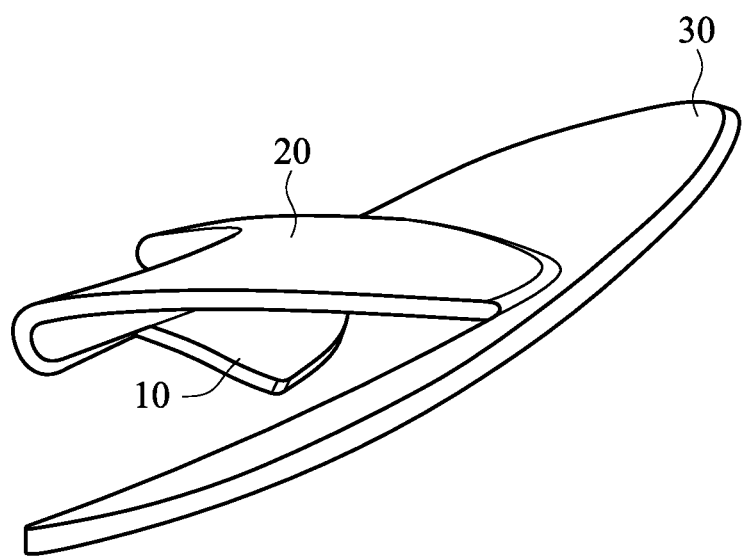
FIG. 2 is a side cross section view of a rear wing plate of a vehicle rear wing structure according to the present invention.
Figure 3:
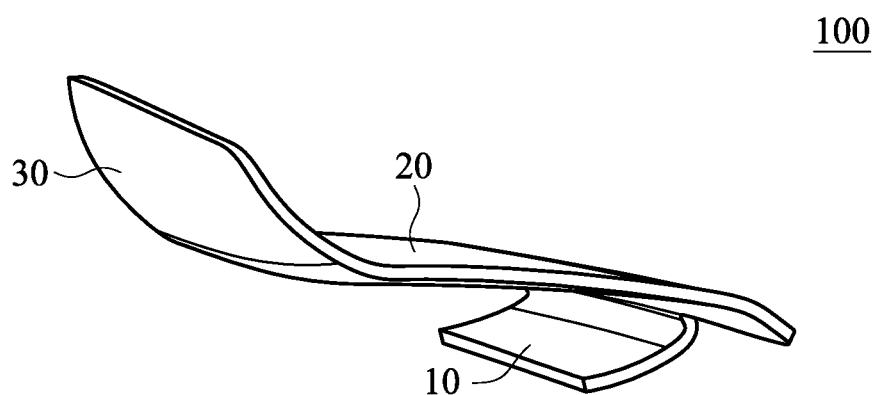
FIG. 3 is a perspective view of a rear wing plate of a vehicle rear wing structure according to the present invention.
Figure 4:
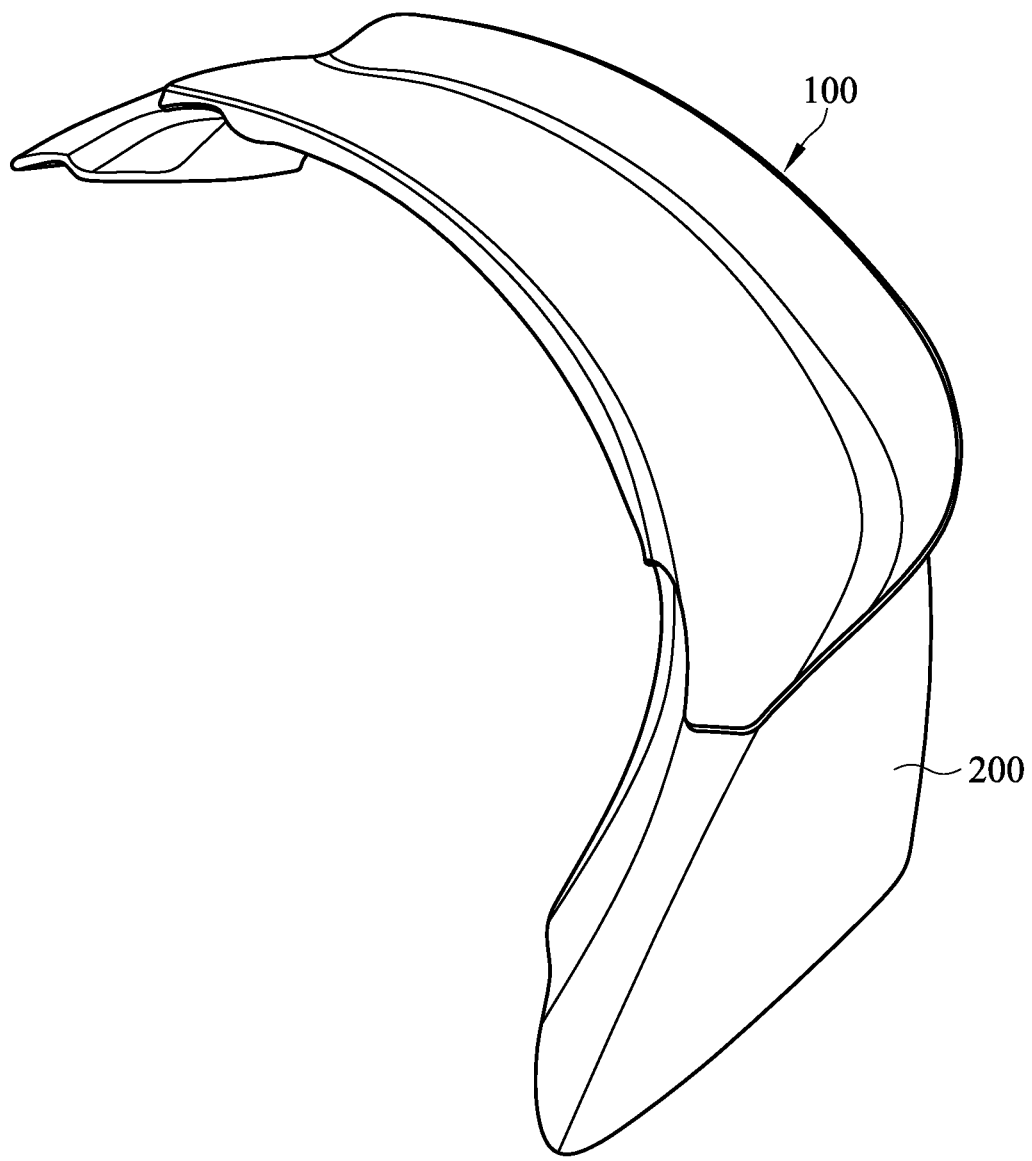
FIG. 4 is a top view of an assembly of a rear wing plate and a rear wing according to the present invention.
Figure 5:
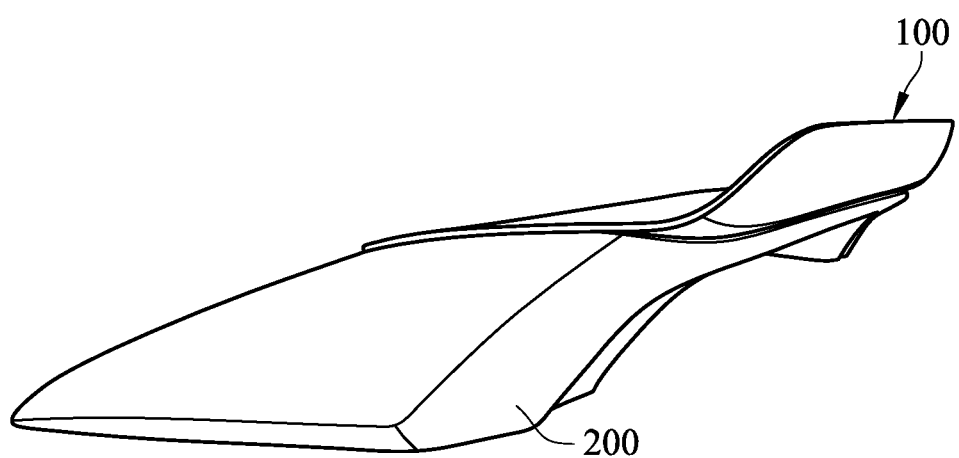
FIG. 5 is a side view of an assembly of a rear wing plate and a rear wing according to the present invention.
Figure 6:
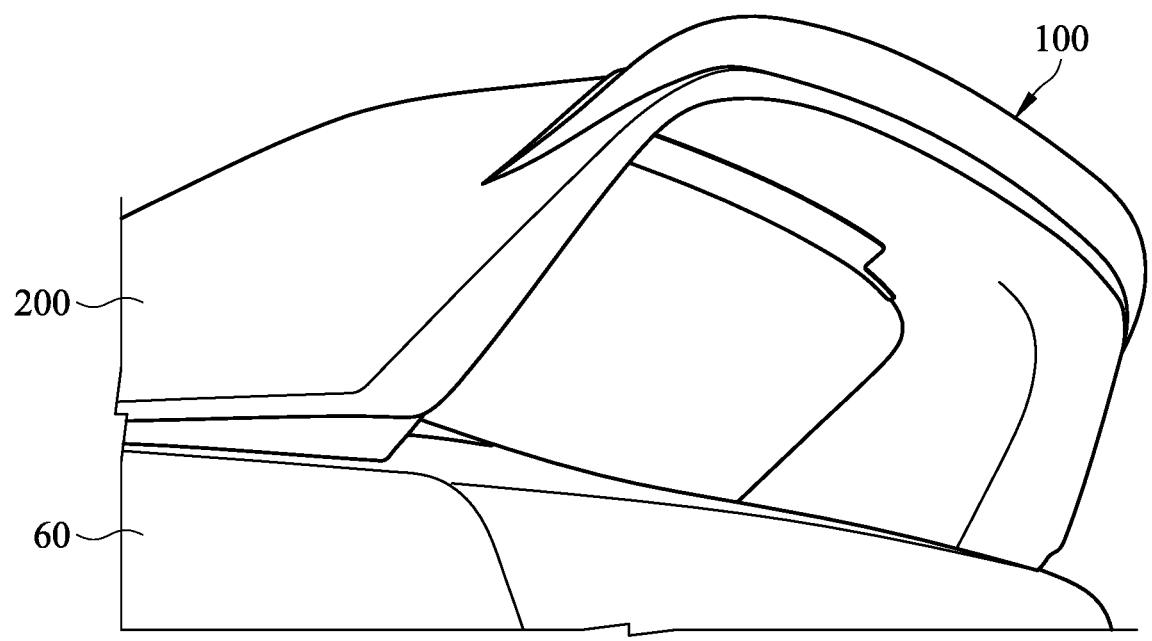
FIG. 6 is a top view of installing an assembly of a rear wing plate and a rear wing onto a top of a vehicle rear trunk according to a first embodiment of the present invention.
Figure 7:
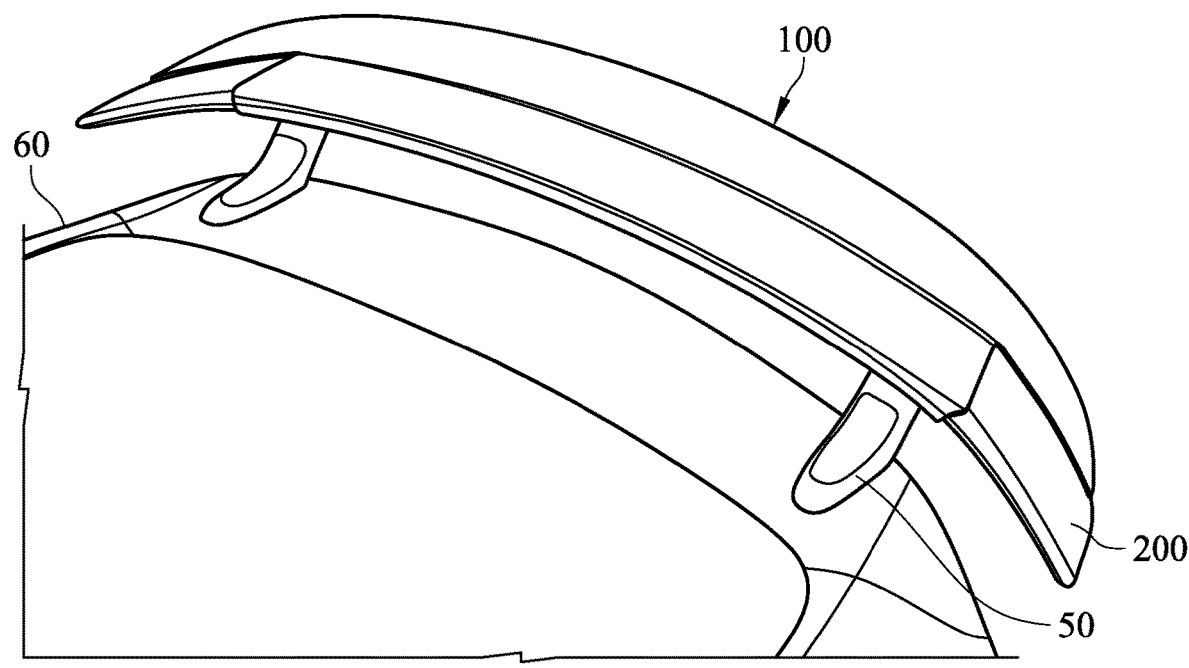
FIG. 7 is a top view of installing an assembly of a rear wing plate and a rear wing onto a top of a vehicle rear trunk by using a plurality of fixing pieces according to a second embodiment of the present invention.

Refer to FIGS. 1 to 7 respectively for a top view of a rear wing plate of a vehicle rear wing structure according to the present invention; a side cross section view of a rear wing plate of vehicle rear wing structure according to the present invention; a perspective view of a rear wing plate of vehicle rear wing structure according to the present invention; a top view of an assembly of a rear wing plate and a rear wing according to the present invention; a side view of an assembly of a rear wing plate and a rear wing according to the present invention; a top view of installing an assembly of a rear wing plate and a rear wing onto a vehicle rear trunk according to a first embodiment of the present invention; and a top view of installing an assembly of a rear wing plate and a rear wing onto a vehicle rear trunk using a plurality of fixing pieces according to a second embodiment of the present invention.

As shown in FIGS. 1 to 7, the present invention provides a vehicle rear wing structure 300, that includes a rear wing plate 100 and a rear wing 200. Wherein the rear wing plate 100 includes: a buckle portion 10, formed into an angular structure, and is used to clip and hold along a front end of the rear wing 200, so that the rear wing plate 100 is fixed securely onto a surface of the rear wing 200, and the rear wing plate 100 will not be blown away due to wind resistance when a vehicle moves at high speed; a main body portion 20, formed into a planar plate structure, and is disposed on a surface of the rear wing 200, and is connected and fixed to the buckle portion 10, on an inner surface of a rear part of the main body portion 20 is disposed an adhesive portion, this adhesive portion is a double-sided adhesive tape and is positioned on the surface of the rear wing 200; and a protrusion portion 30, formed into a tilt-up structure, this tilt-up structure tilts up along a rear end of the rear wing 200 to form a wind resistant plane, and it is connected and fixed along a rear end of the main body portion 20, and it generates a downward force when the vehicle moves at high speed, Wherein, the buckle portion 10, the main body portion 20, and the protrusion portion 30 are formed integrally into a body.

In an embodiment of the present invention, the angle formed by the buckle portion 10 is less than 90 degrees.

In an embodiment of the present invention, the rear wing plate 100 is formed into an acrylic body using a hot pressing method.

In an embodiment of the present invention, the rear wing plate 100 is formed by carbon fiber using a composite mold method.

In an embodiment of the present invention, the rear wing 200 is connected and fixed onto a top surface of a vehicle rear trunk 60.

In an embodiment of the present invention, the vehicle rear wing structure 300 further includes a plurality of fixing pieces 50, used to fixing the rear wing 200 onto the vehicle rear trunk 60.

In the following, the steps of assembling and installing the vehicle rear wing structure are described in detail. Firstly, cleaning the surface of the rear wing 200; next, clipping and affixing the rear wing plate 100 along the front end of the rear wing 200 (on this portion of the rear wing plate 100, no double-sided adhesive tape is disposed); then, tearing off the release paper of the double-sided adhesive tape disposed on the inner surface of the rear part of the main body portion 20, to firmly adhere the rear wing plate 100 onto the rear wing 200. For this structure, the tilt-up portion of the rear wing plate 100 generates wind resistance while the vehicle is moving at high speed. In the design of the present invention, the rear wing plate 100 is clipped onto, and firmly fixed onto the front end of the rear wing 200, and when the vehicle moves at speed the resulting wind resistance produces a force, and this force acts to strengthen the adhesion of the rear wing plate 100 onto the rear wing 200, so that the rear wing plate 100 is fixed securely onto the rear wing 200, and thus is not blown away by the wind resistance.

Through using the vehicle rear wing structure of the present invention, the drawbacks of the existing technology can be overcome effectively. The reason for this is that, in the existing technology, the rear wing plate 100 is adhered and fixed onto the rear wing 200 through only using the double-sided adhesive tape. As such, for a vehicle moving at fast speed, the protrusion portion of the rear wing plate 100 produces strong wind resistant forces, and these forces could easily blow away the rear wing plate 100. In contrast, in the present invention, the rear wing plate 100 is clipped around and onto the front end of the rear wing 200, and due to this design the forces generated by the wind resistance when the vehicle moves at speed act to strengthen the adhesion of the rear wing plate 100 onto the rear wing 200, and thus is not blown away by the wind resistance, to overcome the shortcomings of the Prior Art.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A vehicle rear wing structure, comprising a rear wing plate and a rear wing,
   wherein
   the rear wing plate includes:
   a buckle portion, formed into an angular structure, and is used to clip and hold along a front end of the rear wing, so that the rear wing plate is fixed securely onto a surface of the rear wing, and the rear wing plate will not be blown away due to wind resistance when a vehicle moves at a high speed;
   a main body portion, formed into a planar plate structure, and is disposed on a surface of the rear wing, and is connected and fixed to the buckle portion; and
   a protrusion portion, which is formed into a tilt-up structure and tilts up along a rear end of the rear wing to form a wind resistance plane, connected and fixed along a rear end of the main body portion, and generates wind resistance when the vehicle moves at a high speed,
   wherein, the buckle portion, the main body portion, and the protrusion portion are formed integrally into a body.

2. The vehicle rear wing structure as claimed in claim 1, wherein an angle formed by the buckle portion is less than 90 degrees.

3. The vehicle rear wing structure as claimed in claim 1, wherein the rear wing plate is formed by acrylic through using hot pressing.

4. The vehicle rear wing structure as claimed in claim 1, wherein the rear wing plate is formed by carbon fiber through using male and female molding.

5. The vehicle rear wing structure as claimed in claim 1, wherein the rear wing is connected and fixed onto a top surface of a vehicle rear trunk.

6. The vehicle rear wing structure as claimed in claim 1, further comprising a plurality of fixing pieces, used to fix the rear wing onto the top surface of the vehicle rear trunk.

* * * * *